G. R. FRANCE.
LOCOMOTIVE DRIVING GEAR.
APPLICATION FILED AUG. 16, 1918.
1,340,762.
Patented May 18, 1920.
2 SHEETS—SHEET 1.
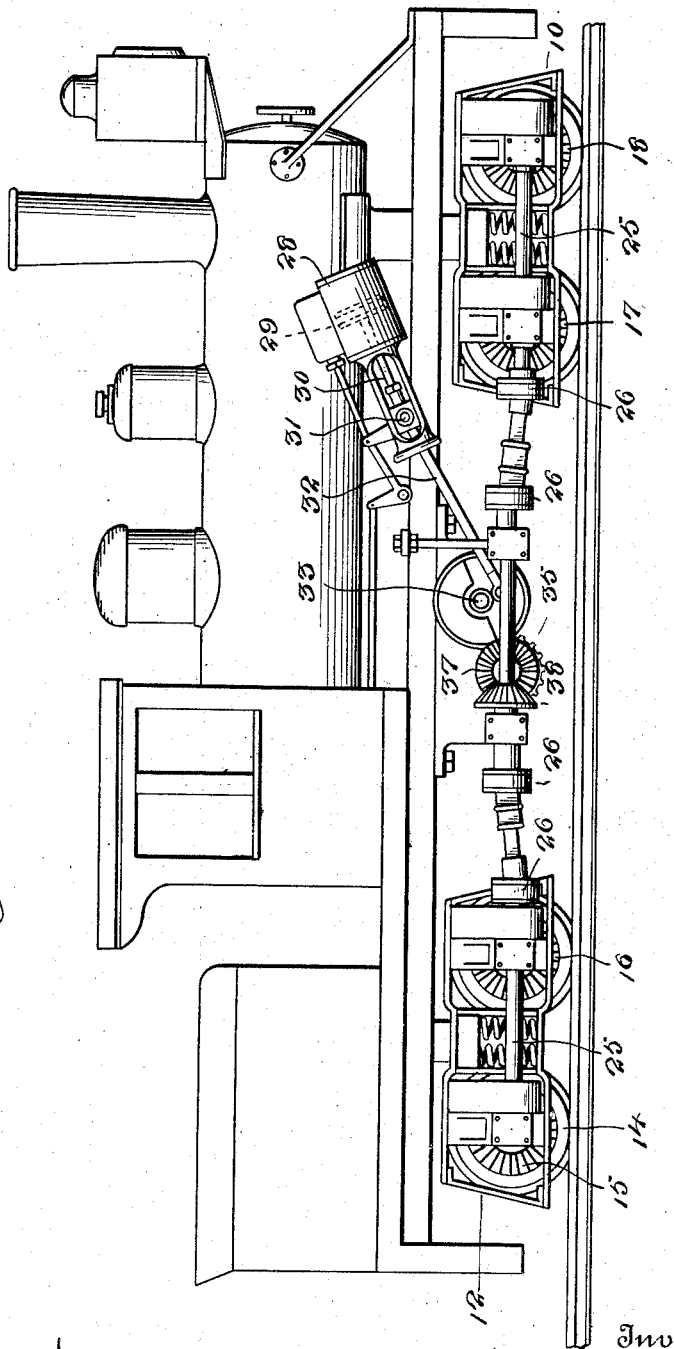
Witnesses
E. R. Ruppert
Inventor
G. R. France
By Victor J. Evans
Attorney

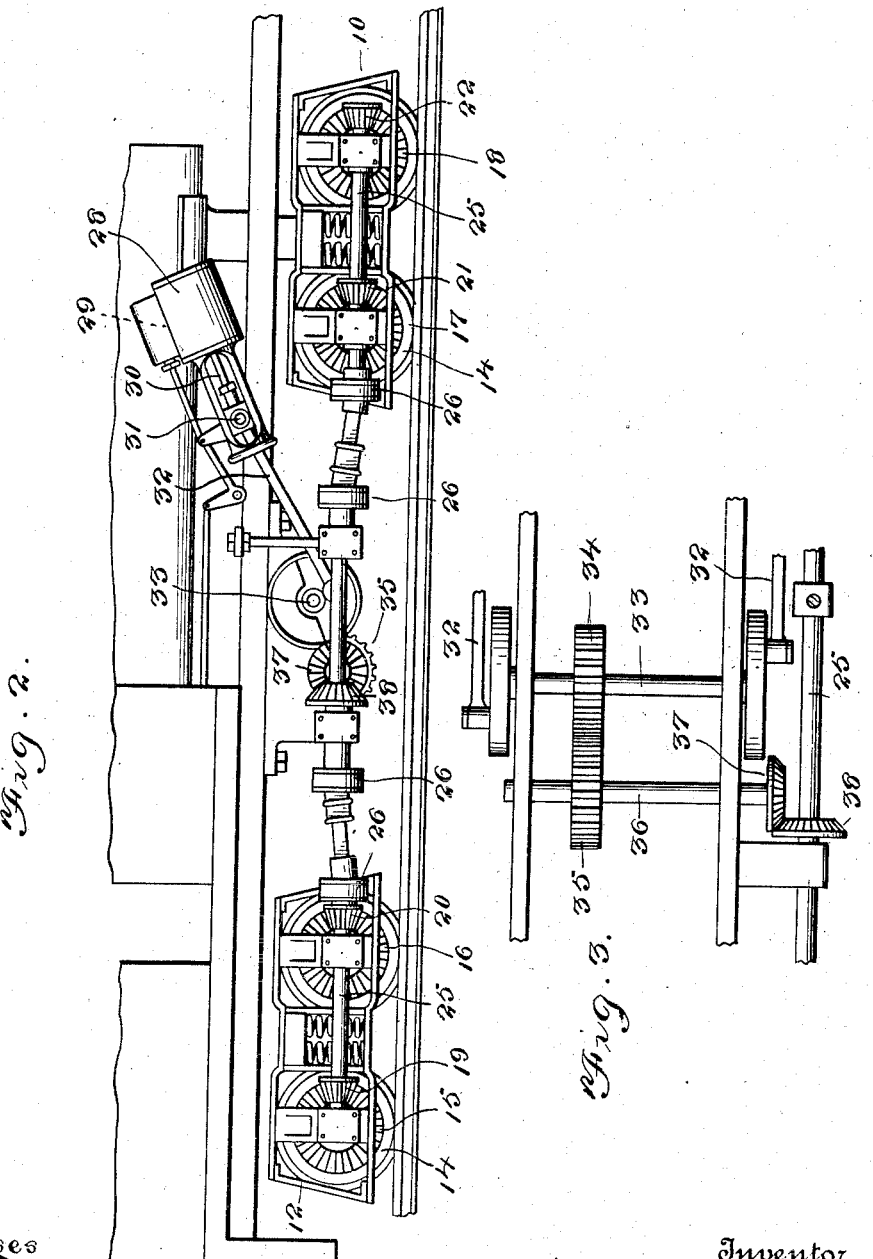

UNITED STATES PATENT OFFICE.

GEORGE R. FRANCE, OF WAYCROSS, GEORGIA.

LOCOMOTIVE DRIVING-GEAR.

1,340,762. Specification of Letters Patent. Patented May 18, 1920.

Application filed August 16, 1918. Serial No. 250,199.

*To all whom it may concern:*

Be it known that I, GEORGE R. FRANCE, a citizen of the United States, residing at Waycross, in the county of Ware and State of Georgia, have invented new and useful Improvements in Locomotive Driving-Gears, of which the following is a specification.

This invention relates to a locomotive driving gear, and one object is to provide for driving each of the wheels of the forward and rear trucks of a locomotive directly from a longitudinal shaft which in turn is driven by gearing directly operative from the pistons in the respective cylinders on each side of the engine.

A further object is to provide, in connection with the aforesaid construction, a plurality of meshing gear wheels, one of which is mounted on a counter shaft, and the other on the crank shaft, said gear wheels, shafts, and certain miter gears imparting motion to the longitudinal driving shafts. The shaft is formed in sections connected by universal joints, certain of said shaft sections carrying gear wheels meshing with gear wheels on the wheels of the forward and rear trucks of the locomotive.

With the foregoing and other objects in view, the invention consists in the novel construction, combination and arrangement of elements hereinafter described and claimed.

In the drawings, Figure 1 is a view in side elevation showing the driving gear applied to a locomotive, Fig. 2 is a detail in side elevation showing the pinions on the line shaft meshing with miter gears on the axles of each truck, Fig. 3 is a fragmentary view in top plan showing the transverse crank shaft and a transverse countershaft through which the drive is imparted to the line shaft.

In order that my invention may be understood, I have shown conventionally a portion of a locomotive including a forward truck 10 and a rear truck 12, the wheels of said trucks being designated 14 and being driven respectively by crown gears 15, 16, 17, and 18, the latter meshing with beveled pinions 19, 20, 21, and 22 on the line shaft 25. This line shaft is formed in a plurality of sections connected by means of universal joints or couplings 26.

One of the cylinders of the engine is shown at 28, a piston 29 therein having connection with piston rod 30 and crosshead 31 which in turn is connected with pitman 32 for driving the crank shaft 33.

This crank shaft 33 carries a gear wheel 34 meshing with gear wheel 35 on the counter shaft 36. Shaft 36 carries on each end thereof a miter gear 37 meshing with the miter gear 38 on the main driving shaft 25. Especial attention is directed to the drive through the crank shaft, the counter shaft and the main or longitudinal shaft 25, and thence to the several crown gear wheels on the trucks. The axes of miter wheels 37 and 38 and of the shaft 36 and that portion of shaft 25 carrying gears 38 are in the same plane, and a direct and effective drive is secured, as distinguished from the indirect drive in certain other types of locomotive driving gear. It will be observed, upon an inspection of Figs. 2 and 3, that the shaft 33 is in a plane above the plane of shaft 36, and forward thrust on the line shaft, which would tend to cause shafts 33 and 36 (if in the same plane) to become bound in their bearings, is to a great extent obviated.

What is claimed is:

1. In a device of the class described, a cylinder, a piston therein, a crank shaft driven from said piston, a counter shaft driven from the crank shaft, a line shaft, miter gears mounted on the line shaft and on the counter shaft and having their axes in the same plane, and means for directly driving the wheels of the forward and rear trucks of a locomotive from said line shaft.

2. In a device of the class described, a cylinder, a piston therein, a crank shaft driven by said piston, a counter shaft driven from the crank shaft, a line shaft formed in sections, universal joints connecting the sections of the line shaft, a plurality of miter gears for driving the line shaft from the counter shaft, a plurality of crown gears for directly driving the wheels of the forward and rear trucks of a locomotive, and pinions carried by the line shaft and meshing with said crown wheels.

3. In a device of the class described, a plurality of crown wheels for driving the wheels of the forward and rear trucks of a locomotive, a line shaft formed in sections, universal couplings connecting the sections of the line shaft, a miter gear carried by one section of the line shaft, a miter gear meshing therewith, the axes of said gears being in the same plane, a counter shaft for mounting one of said miter gears, and means for driving the counter shaft, said means last named including gear wheels, one of which is mounted on the counter shaft, and a shaft for mounting the other gear wheel with its axis in a plane above the plane of the counter shaft.

In testimony whereof I affix my signature.

GEORGE R. FRANCE.